United States Patent [19]
Muller

[11] Patent Number: 5,349,347
[45] Date of Patent: Sep. 20, 1994

[54] METHOD AND APPARATUS FOR CORRECTING DYNAMICALLY INDUCED ERRORS IN STATIC PRESSURE, AIRSPEED AND AIRSPEED RATE

[75] Inventor: Hans R. Muller, Redmond, Wash.

[73] Assignee: AlliedSignal Inc., Morris Township, Morris County, N.J.

[21] Appl. No.: 38,117

[22] Filed: Mar. 29, 1993

[51] Int. Cl.$^5$ ............................................. G08B 23/00
[52] U.S. Cl. ...................................... 340/969; 73/180; 340/977
[58] Field of Search ............... 340/963, 970, 969, 977, 340/978; 73/179, 181, 180, 182, 170.02, 170.14, 170.07, 170.11, 708; 244/180, 182; 364/433

[56] References Cited

U.S. PATENT DOCUMENTS

| 3,190,114 | 6/1965 | Westman | 73/180 |
| 3,228,247 | 1/1966 | Hansen et al. | 73/180 |
| 4,725,811 | 2/1988 | Muller et al. | 340/968 |
| 4,792,799 | 12/1988 | Grove | 340/963 |
| 4,891,642 | 1/1990 | Muller | 340/968 |
| 5,001,476 | 3/1991 | Vermilion et al. | 340/970 |

Primary Examiner—Brent Swarthout
Attorney, Agent, or Firm—Howard G. Massung

[57] ABSTRACT

A system for correcting errors in static pressure, airspeed or airspeed rate caused by maneuvering that causes variations in static air pressure measurements compares a barometrically derived vertical velocity or altitude signal with an inertially-derived vertical velocity or altitude signal to provide a correction signal that is representative of changes in static air pressure and is used to correct the static pressure, airspeed or airspeed rate signal.

20 Claims, 2 Drawing Sheets

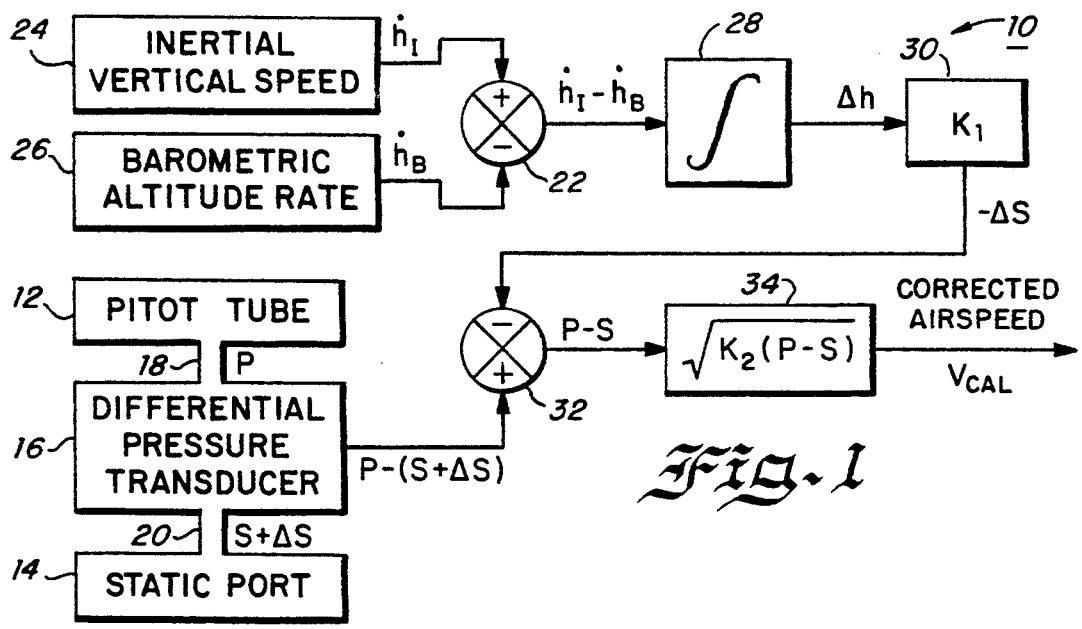
*Fig. 1*
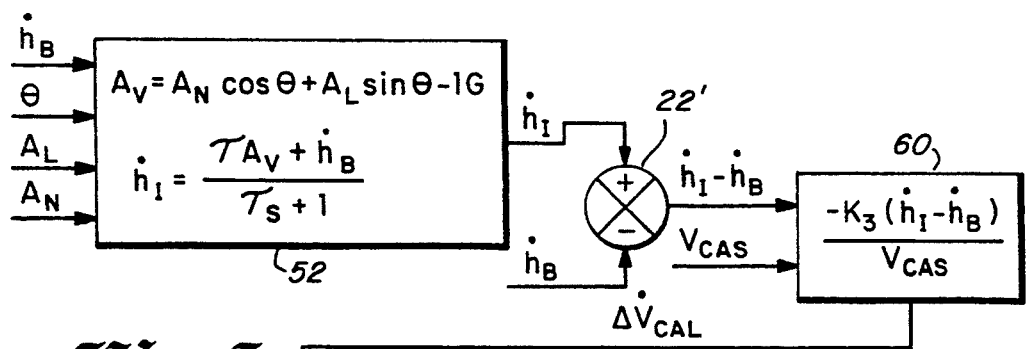
*Fig. 3*
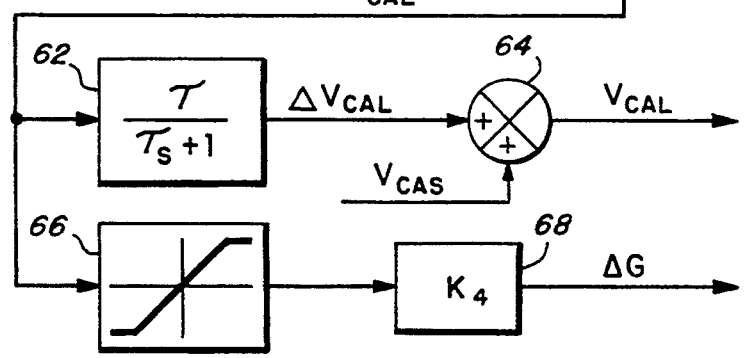
*Fig. 4*
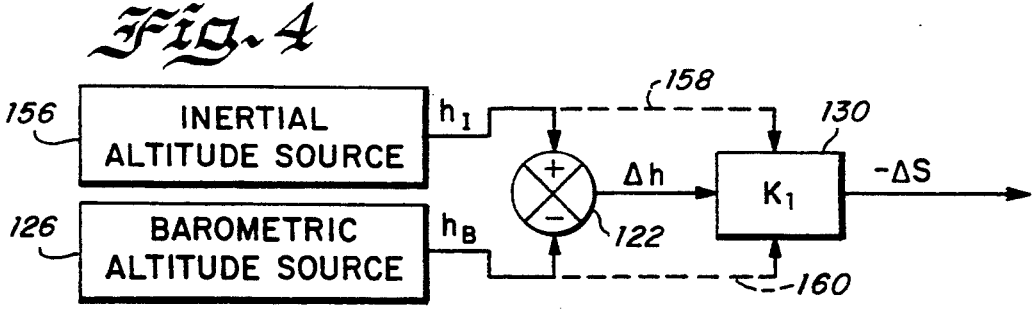

METHOD AND APPARATUS FOR CORRECTING DYNAMICALLY INDUCED ERRORS IN STATIC PRESSURE, AIRSPEED AND AIRSPEED RATE

BACKGROUND OF THE INVENTION

1. Field of the Invention

Static pressure is an important parameter that is utilized in aircraft for numerous purposes including the determination of altitude, altitude rate, airspeed and airspeed rate, which last-mentioned parameters are, in turn, used as inputs to various other devices such as flight management systems, autopilots, ground proximity warning systems and wind shear detectors. Such systems are sensitive to errors in airspeed and airspeed rate, as well as altitude rate, caused by errors in static pressure readings. In particular, wind shear detection and warning systems are particularly sensitive to airspeed rate errors can give false warnings as a result of erroneous airspeed rate measurements thus reducing the pilot's confidence in the instrument.

2. Description of the Prior Art

Airspeed in an aircraft is determined by taking the difference in pressure between a ram pressure obtained from a pitot tube located in the airstream around the aircraft and a static pressure taken from a static port located in a region of relatively undisturbed air flow along the aircraft optimized to provide minimum altitude errors in steady state cruise. In some airspeed systems, the static port is collocated with the pitot port. These systems are not subjected to the same airspeed errors. In early airspeed indicators, the static pressure and the ram pressure were applied to opposite sides of a diaphragm that was deflected by the difference in the two air pressures. The diaphragm was mechanically coupled to a dial that was calibrated in airspeed. During high angle of attack or high angle of attack rate maneuvers, static pressure errors affect the airspeed readout. Correction tables are published in the Flight Manual by the aircraft manufacturer for aircraft where this error is significant. The pilot has no other absolute reference, so he does not know that the indicated airspeed is in error. In addition, some modern aircraft such as large transport aircraft encounter large variations in static pressure during extreme maneuvering, and such variations can cause significant errors in airspeed and airspeed rate measurements because, in such aircraft, the static port is generally spaced a long distance from the pitot tube and dynamic static pressure variations at the static port do not correspond to those of the pitot tube.

The static probe location is optimized to provide minimum altitude errors in cruise on some aircraft and the dynamic pressure variations at the static port are reduced by providing a lag can at the static port. Thus, any pressure variations entering the static port enter the lag can and are integrated by the volume of the lag can before being applied to any transducer. While such a lag reduces the dynamic variations in the static pressure during maneuvering, the integrating action of the lag can results in a one to two second delay in the static pressure measurement. While such a delay does not significantly impair the operation of standard instruments such as airspeed indicators and barometric altimeters, it is troublesome to certain newer instruments, such as wind shear detection and warning systems.

Dynamic altitude rate errors have been minimized in the past by using inertial vertical speed computed in a complementary filter which combines short term inertial vertical speed with long term barometric vertical speed. Similarly, airspeed and airspeed rate errors due to static pressure errors have been corrected by combining longitudinal inertial acceleration with airspeed in a complementary filter. For wind shear detection systems, this method cannot be used because it defeats the purpose of detecting wind shear, namely, the difference between inertial and airmass speed.

Wind shear detection and warning systems monitor airspeed or airspeed rate and compare it with an inertially-derived velocity or acceleration, and if the airspeed or airspeed rate diverges substantially from the corresponding inertially-derived velocity or acceleration, a wind shear warning is given. However, since airspeed and airspeed rate are derived from the difference between pitot pressure and static pressure, any erroneous dynamic variations in static pressure caused by maneuvering or other aircraft related factors can cause errors or variations in the airspeed or airspeed rate measurements of a sufficient magnitude to affect the operation of a wind shear warning system significantly and to cause the system to give false warnings, thereby eroding pilot confidence in the device.

SUMMARY

Accordingly, it is an object of the present invention to provide a system that corrects dynamically induced errors in static pressure measurements.

It is another object of the present invention to provide a system that corrects induced errors in airspeed measurements caused by dynamically-induced static pressure variations.

It is yet another object of the present invention to provide a system that corrects errors in airspeed rate measurements resulting from dynamically induced static pressure.

It is still another object of the present invention to provide a system that reduces the number of false warnings generated by wind shear detection and warning systems that result from static pressure measurement errors.

The corrections to static pressure measurements and other static pressure dependent measurements, such as airspeed and airspeed rate, are obtained by comparing a barometric altitude rate signal with an inertially-derived vertical speed that may be obtained, for example, from an inertial navigation system, or by other methods. As long as there are no extraneously caused perturbations in the static pressure signal, the values of the inertially-derived vertical velocity and the barometric altitude rate signals should track. However, in the case of a dynamically induced error in the static pressure reading caused, for example, by maneuvering, the value of the barometric altitude rate signal will depart from that of the inertially-derived vertical velocity signal. Such a departure can be utilized to correct the static pressure errors or errors in readings such as airspeed and airspeed rate that utilize static pressure as an input.

For example, if it is desired to correct the static pressure reading, the difference between the inertially-derived vertical velocity and the barometric rate may be integrated to provide an altitude difference signal. An alternative method of computing an altitude difference signal is to use the difference between an inertial altitude ($h_I$) signal and barometric (pressure) altitude directly. The inertial altitude signal $h_I$ can be obtained from an inertial navigation system, $h_I$ being qual to inertial altitude in the short term and equal to pressure altitude over the long term. This method eliminates the need for integration if the appropriate input signals are available. The altitude difference signal may then be operated on by appropriate constants and altitude corrections factors to obtain a pressure difference or static pressure correction signal that may be used to correct the static pressure signal and, consequently, signals such as airspeed and airspeed rate.

Instead of correcting the static pressure signal, the pressure correction signal can also be used to correct the differential pressure between the pitot tube pressure and the static pressure to provide a corrected differential pressure. The corrected differential pressure can then be used to determine accurate airspeed and airspeed rates.

In certain aircraft, pressure signals are not readily available, but an airspeed signal is. Under such conditions, the pressure differential between pitot pressure and static pressure can be calculated from the airspeed signal to provide an uncorrected pressure differential signal. The uncorrected pressure differential signal can then be corrected by the pressure correction signal and a corrected airspeed can then be recalculated from the corrected pressure differential signal.

In applications such as wind shear warning systems, wherein it is desirable to have an accurate airspeed rate signal, an airspeed rate error signal can be corrected directly. In such an application, the airspeed rate error signal may be computed directly from the difference between the inertially-derived vertical velocity signal, the barometric rate signal and the uncorrected airspeed signal. The airspeed rate error signal can then be used to correct the airspeed rate signal or applied directly to the wind shear detector as a correction factor.

BRIEF DESCRIPTION OF THE DRAWING

These and other objects and advantages of the present invention will become readily apparent upon consideration of the following detailed description and attached drawing, wherein:

FIG. 1 is a block diagram of the static pressure correction system according to the invention used to correct airspeed;

FIG. 3 illustrates the complementary filter of FIG. 2 in greater detail and illustrates how an airspeed rate correction signal may be obtained directly; and FIG. 4 is a partial block diagram of an alternative embodiment of the invention.

DETAILED DESCRIPTION OF THE PREFERRED EMBODIMENT

Figure 2:
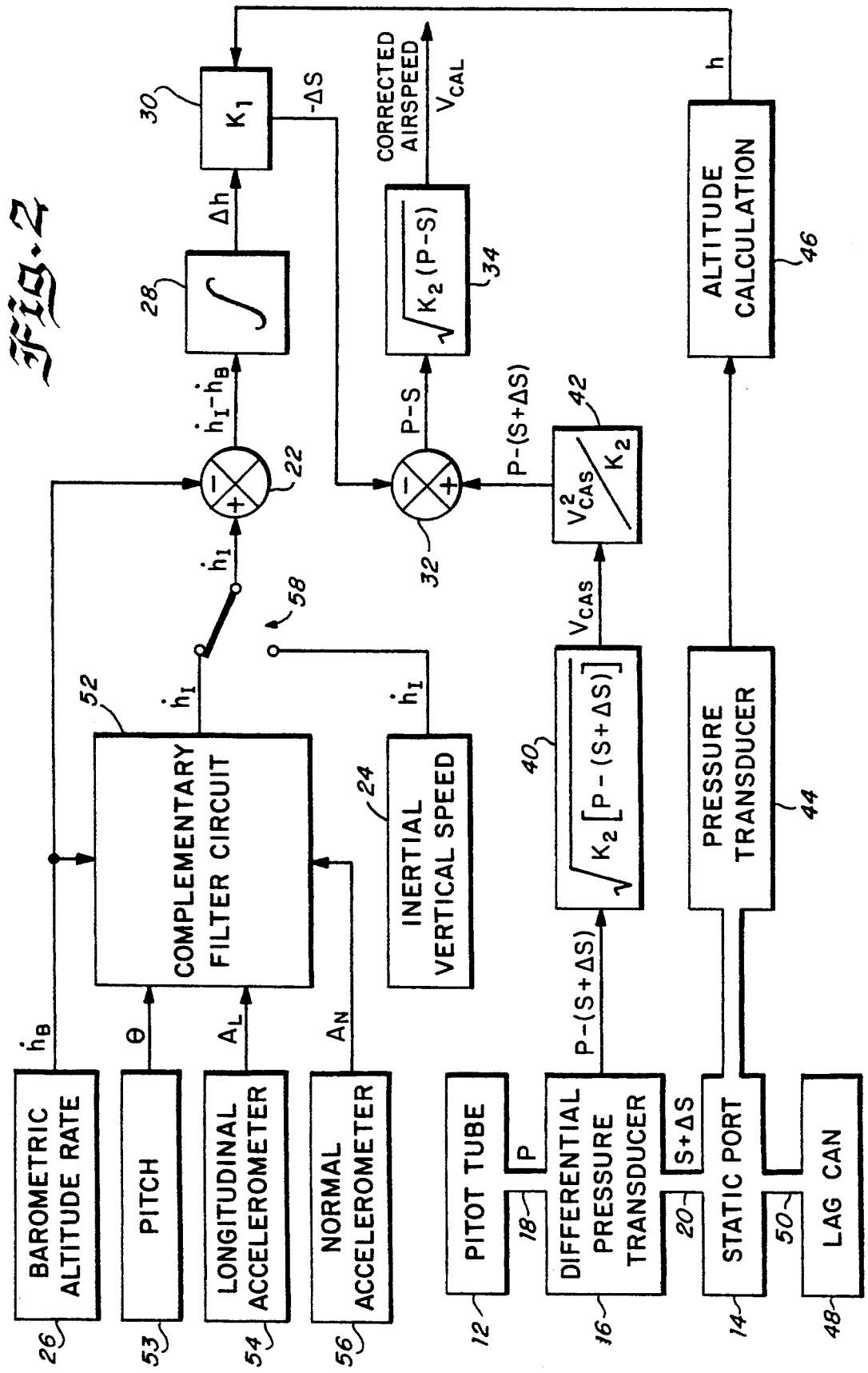
FIG. 2 is a block diagram of another embodiment of the system utilized to correct airspeed in aircraft where pressure signals and inertial navigational signals are not readily available.

Referring to FIG. 1, there is shown a simplified block diagram of one embodiment of the static pressure correction system used to correct airspeed. Airspeed is measured by measuring the difference in pressure between ram air pressure sensed by a pitot tube, such as a pitot tube 12, and static pressure as measured by a static port 14. The pitot tube, such as the pitot tube 12, is normally mounted near the front of an aircraft with the opening of the tube facing forward so that the ram air pressure which is a function of the velocity of the aircraft may be measured as the aircraft is moving. The static port, such as the static port 14, is normally mounted on the aircraft in an area of relatively little air turbulence, such as along the side of the fuselage near the wing so that the static air pressure may be measured. However, during maneuvering of the aircraft, the pressure sensed by the static port 14 can vary as a result of changes in the airstream and in the angle of the static port relative to the airstream, thus causing errors in the static pressure reading.

The outputs of the pitot tube 12 and the static port 14 are coupled to a differential pressure transducer 16 by a pair of tubes 18 and 20. The differential pressure transducer 16 may include a chamber divided by a diaphragm (not shown) with the tubes 18 and 20 entering the chamber at opposite sides of the diaphragm. Thus, the position of the diaphragm will vary as a function of the difference between the pitot tube pressure and the static air pressure. The position of the diaphragm may be monitored to provide a signal representative of the differential pressure between the pitot tube 12 and the static port 14.

The output pressure of the pitot tube 12 is a function of the airspeed of the aircraft and is designated as P on FIG. 1. The pressure output of the static port 14 is a function of the static pressure of the air surrounding the aircraft and is designated as S in FIG. 1. However, during maneuvering, a dynamic error component is introduced into the output of the static port 14, as designated by the symbol $\Delta S$. Thus, the output of the differential pressure transducer 16 becomes $P-(S+\Delta S)$ and includes the dynamic pressure error term $\Delta S$. Since airspeed is calculated from the differential pressure, the error term $\Delta S$ will introduce an error into the airspeed reading.

In accordance with an important aspect of the invention, the static pressure error term $\Delta S$ may be compensated for by comparing an inertially-derived vertical velocity with an airmass derived vertical velocity. The inertially-derived vertical velocity is not affected by relatively short term changes in static air pressure, but the airmass derived vertical velocity is. Thus, the static pressure error $\Delta S$ may be calculated from the difference between the inertially-derived and the airmass-derived vertical velocities. In FIG. 1, a summing junction 22 generates the difference between an inertially-derived vertical speed signal $h_I$ obtained from an inertial vertical speed source 24 and an airmass-derived vertical velocity $h_B$ derived from a barometric altitude rate source. The inertial vertical speed source may be an inertial navigation system on the aircraft. For aircraft not having an inertial navigation system, the vertical velocity signal may be obtained from various accelerometers and gyroscopes whose signals are applied to a complementary filter as will be discussed in conjunction with FIGS. 2 and 3. Alternatively, the vertical velocity may be obtained from a global satellite positioning system if such a system is available. The airmass-derived vertical velocity $h_B$ may be conveniently obtained by differentiating the output of a barometric altimeter.

The output of the summing junction 22 is the difference $h_I-h_B$ that represents the error in vertical velocity caused by the static pressure error term $\Delta S$. The difference $h_I-h_B$ is integrated by an integrator 28 to provide an altitude error term $\Delta h$. The term $\Delta h$ represents the error in altitude caused by the static pressure error $\Delta S$ applied to the barometric altimeter. Since air pressure is related to altitude, the altitude error $\Delta h$ can be converted to a pressure error by multiplying it by an appropriate factor such as a constant. $K_1$ utilizing, for example, a multiplier or scaling amplifier 30 to provide the static error term $\Delta S$. If the airspeed/airspeed rate correction is generated for use by a wind shear warning system which operates at low altitude levels, the factor $K_1$ may remain a constant, but if corrections are required at other altitudes, the value of factor $K_1$ may be varied as a function of altitude in accordance with the standard atmosphere altitude-pressure characteristic.

The $\Delta S$ output from the scaling amplifier 30 is applied to a summing junction 32 that also receives the differential pressure signal $P-(S+\Delta S)$ from the differential pressure transducer 16. The summing junction 32 subtracts out the error term $\Delta S$ and provides a corrected differential pressure $P-S$. Because the differential pressure $P-S$ varies approximately as the square of airspeed, the airspeed may be calculated by taking the square root of the differential pressure as multiplied by an appropriate factor such as a constant $K_2$. This manipulation is accomplished by a block 34 that multiplies the differential pressure term $P-S$ by a constant $K_2$ and takes the square root of the resulting product to provide a corrected airspeed $V_{CAL}$. The value of $K_2$ is determined by the units of the differential pressure and the desired airspeed units. For example, for airspeed expressed in knots and pressure in pounds per square foot, the value of $K_2$ is 295.

In some aircraft, the differential pressure signal from the differential pressure transducer 16 is not available, but in accordance with the present invention, may be obtained from a calibrated airspeed signal $V_{CAS}$. As shown in FIG. 2, the calibrated airspeed signal is obtained from a computation block 40 that is usually located in the air data computer and typically multiplies the signal $P-(S+\Delta S)$ by the constant $K_2$ and takes the square root of the product to provide the calibrated airspeed $V_{CAS}$. However, because the input to the block 40 includes the static pressure error term $\Delta S$, the value of the calibrated airspeed $V_{CAS}$ is affected by the error term $\Delta S$, and it would be desirable to remove the effects of the error term $\Delta S$ from the value of $V_{CAS}$.

Thus, in accordance with another important aspect of the present invention, the calibrated airspeed $V_{CAS}$ is operated on by a computation block 42 that provides the inverse function of the computation performed by the computation block 40. Thus, in computation block 42, the calibrated airspeed $V_{CAS}$ is squared and the result is divided by $K_2$. The result of the computation is the same differential pressure signal $P-(S+\Delta S)$, that appears at the output of the differential pressure transducer 16. The $P-(S+\Delta S)$ signal can then be applied to the summing junction 32 along with the $\Delta S$ term from the scaling amplifier 30 to subtract out the error term $\Delta S$ and provide a corrected differential pressure signal $P-S$. The corrected differential pressure is then multiplied by the constant $K_2$ and the square root taken in the block 34 to provide the corrected airspeed $V_{CAL}$.

As previously stated, the value of the constant $K_1$ in the scaling amplifier 30 may be varied as a function of altitude if desired. This is accomplished in FIG. 2 by a pressure transducer 44 and an altitude calculation circuit 46 that in effect operate as a barometric altimeter to provide a signal to the block 30 to vary the value of the constant $K_1$ as a function of altitude. The altitude signal can also be provided by an air data computer or by a stabilized pressure source. The system of FIG. 2 also includes a lag can 48 in certain aircraft connected to the static port 14. The lag can 48 is an air reservoir that is connected to the static port by a tube 50. The lag can 48 receives air from the static port 14 and serves to average out pressure changes in the static port 14 so that short term variations in static pressure applied to the transducer 44 are reduced; however, the $\Delta S$ correction is independent of the lag can, and will work whether a lag can is installed or not.

As stated in the discussion of FIG. 1, the inertially-derived vertical velocity signal may be derived from various accelerometers that operate in conjunction with a complementary filter to provide the vertical velocity signal $h_I$. Such a system is shown in FIG. 2. The system of FIG. 2 utilizes a complementary filter 52 that receives inputs from the barometric altitude rate source 26, a pitch signal source 53 such as a vertical gyroscope that provides a pitch signal $\theta$ to the complementary filter 52, a longitudinal accelerometer 54 that provides a longitudinal acceleration signal $A_L$ and a normal accelerometer 56 that provides a normal acceleration signal $A_N$. A switch 58 is used to select the vertical velocity signal $h_I$ from either the inertial vertical speed source 24 (typically from an Inertial Navigation System (INS)), if available, or the complementary filter 52 when the INS signal is not available.

The complementary filter circuit first calculates a vertical acceleration term $A_V$ utilizing the relationship:

$$A_v = A_N \cos\theta + A_L \sin\theta - 1G$$

If desired, the vertical acceleration signal $A_N$ may be compensated for the roll angle of the aircraft utilizing the equation $$A_v = A_N \cos\Phi \cos\theta + A_L \sin\theta - 1G$$

where, $\phi$ is the roll angle of the aircraft. If a lateral acceleration signal is available, it may also be used in the computation of $A_v$. Once the vertical acceleration $A_v$ has been calculated, the inertially-derived vertical velocity $h_I$ may be calculated from the equation $$h_I = \frac{(\tau A_v + h_B)}{(\tau S + 1)}$$

where, $\tau$ is a time constant preferably greater than 10 seconds. Once $h_I$ has been calculated, it may be applied to the switch 58 as shown in FIG. 2 or utilized to correct an airspeed rate error as shown in FIG. 3.

Many instruments such as wind shear warning systems are sensitive to changes in airspeed rate, and in many instances are more sensitive to errors in airspeed rate than to errors in airspeed. Therefore, in accordance with yet another aspect of the present invention, the system can provide an airspeed rate error directly from the difference between the inertially-derived vertical velocity and the barometrically-derived vertical velocity and from calibrated airspeed without having to determine an airspeed error or a static pressure error. To obtain an airspeed rate error directly, the difference between inertially-derived and barometrically-derived vertical velocity, $h_I-h_B$, is applied to a computing block 60 together with the calibrated airspeed $V_{CAS}$. The vertical velocity difference can be obtained from a complementary filter circuit, such as the circuit 52, via a summing junction 22' similar to the summing junction 22 in FIG. 2 or from an inertial vertical speed source 24 and barometric altitude rate source 26 via a summing junction 22 (FIGS. 1 and 2). The calibrated airspeed $V_{CAS}$ may be obtained from the air data computer of the aircraft which utilizes a computing block similar to or equivalent to the computing block 40 (FIG. 2) to provide the calibrated airspeed. The calculating block 60 receives the vertical velocity difference signal and the calibrated airspeed signal and computes an airspeed rate correction signal $\Delta V_{CAL}$ utilizing the relationship $$\Delta V_{CAL} = \frac{-K_3 (h_I - h_B)}{V_{CAS}}$$

The above relationship has been derived from the corrected airspeed equation performed by the calculating block 34 (FIGS. 1 and 2) as is illustrated below:

$$V_{CAL} = \sqrt{K_2 (P - S)} \quad (1)$$

The above equation may be expanded as follows:

$$V_{CAL} = \sqrt{K_2 [P - (S + \Delta S) + \Delta S]} \quad (2)$$

Substituting $$V_{CAS}^2 = K_2 [P - (S + \Delta S)] \quad (3)$$

one obtains Equation (4)

$$V_{CAL} = \sqrt{V_{CAS}^2 + K_2 \Delta S} \quad (4)$$

Utilizing the approximation $$\sqrt{x^2 \pm e} \approx x \pm \frac{e}{2x} \quad (5)$$

if $e < x^2$ provides an Equation (6)

$$V_{CAL} \approx V_{CAS} + \frac{K_2 \Delta s}{2 V_{CAS}} \quad (6)$$

Differentiating Equation (6) provides $$V_{CAL} \approx V_{CAS} + \frac{K_2 \Delta S}{2 V_{CAS}} \quad (7)$$

The last term becomes the airspeed rate error $\Delta V_{CAL}$.

$$V_{CAL} \approx V_{CAS} + \Delta V_{CAL} \quad (8)$$

Correcting for altitude F(H) and substituting $(h_I - h_B) F(H)$ for $\Delta S$ and $K_3$ for $K_2/2 \cdot F(h)$, the airspeed rate error becomes, where F(h) is a function of altitude as previously discussed and is approximately equal to $-75.2$ lb/Ft² per 1000 feet at sea level and F(h) equals $-55.0$ lb/Ft² per 1000 feet at 10,000 feet.

$$V_{CAL} \approx V_{CAS} + \Delta V_{CAL} \quad (9)$$
where, $$\Delta V_{CAL} = \frac{-K_3 (h_I - h_B)}{V_{CAS}} \quad (10)$$

$$K_3 = \frac{K_2}{2} \cdot F(h) \quad (11)$$

-continued $$F(h) = \frac{-75.2 \text{ lb/Ft}^2}{1000 \text{ Feet}} \text{ at sea level} \quad (12)$$

$$K_3 = \frac{295 \times (-75.2)}{2 \cdot 1000} \approx -11 \text{ at sea level} \quad (13)$$

for $h$ in feet/sec,
$V_{CAS}$ in knots, and
$\Delta V_{CAL}$ in knots/sec.

If a corrected airspeed is desired, the airspeed rate correction $\Delta V_{CAL}$ can be applied to an integrator 62 having a time constant, for example, of approximately 100 seconds to provide an airspeed correction term $\Delta V_{CAL}$ that may be added to the calibrated airspeed $V_{CAS}$ through a summing junction 64 to obtain corrected airspeed $V_{CAL}$.

However, for systems requiring an airspeed rate correction signal, the airspeed rate correction $\Delta V_{CAL}$ may be applied directly from the computing block 60 to the appropriate device. In some systems, it may be desirable to limit the excursion of the airspeed rate error signal $\Delta V_{CAL}$. Under such circumstances, the output of the computing block 60 could be applied to a limiter such as a limiter 66 and if a change in units is desired, for example, from knots per second to G's the airspeed rate signal could be applied to a scaling amplifier 68 that has a gain constant $K_4$, either directly or through the limiter 66 in order to convert the airspeed rate error signal to appropriate units, for example to G's.

A system such as the one illustrated in FIG. 3 can be used in conjunction with a wind shear detection system of the type disclosed in U.S. Pat. Nos. 4,725,811 and 4,891,642, both incorporated herein by reference. If the system of FIG. 3 were so used, the output of the scaling amplifier 68 could be applied, for example, to one of the summing junctions 54, 54' or 174 of U.S. Pat. No. 4,725,811 or to one of the summing junctions 110 and 112 of U.S. Pat. No. 4,891,642 in the appropriate polarity to correct for dynamically-induced true airspeed errors. Alternatively, the corrected airspeed signal $V_{CAL}$ can be used as the airspeed input signal for the wind shear detector and warning system to provide an accurate airspeed signal that has been corrected for errors resulting from errors resulting from static pressure errors to the system.

In an alternative embodiment, as illustrated in FIG. 4, the difference between barometrically (airmass) and inertially derived altitude may be used to provide the correction signal. As is illustrated in FIG. 4, a difference signal $\Delta h$ is obtained from a summing junction 122 that takes the difference between a barometric altitude signal $h_B$ from a barometric altitude source 126 and an inertial altitude source 156. The correction signal is multiplied by an appropriate constant $K_1$ by a scaling amplifier 130 whose gain may be controlled as a function of altitude by the barometric altitude source 126 or the inertial altitude source 156 as indicated by the dashed lines 158 and 160 in a manner previously described in conjunction with FIG. 2.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A rate of change of airspeed correction system for aircraft, comprising:
   means for providing an airmass derived signal representative of the vertical velocity of the aircraft;
   means for providing an inertially-derived signal representative of the vertical velocity of the aircraft;
   means for comparing the airmass derived and inertially-derived vertical velocity signals and providing a vertical velocity difference signal in response to the difference between the airmass and inertially-derived vertical velocity signals; and
   means responsive to said difference signal for providing an airspeed rate correction signal in response to the magnitude of the difference signal.

2. The system recited in claim 1, further including means for providing a signal representative of the airspeed of the aircraft, wherein said airspeed rate correction signal providing means is further responsive to said airspeed representative signal for providing said airspeed rate correction signal.

3. The system recited in claim 1, wherein said inertially-derived signal providing means includes an inertial navigation system.

4. The system recited in claim 1, wherein said inertially-derived signal providing means includes a longitudinal accelerometer, a normal accelerometer, a pitch angle signal source and a barometric rate signal source.

5. The system recited in claim 4 further including a complementary filter responsive to said longitudinal accelerometer, said normal accelerometer, said pitch angle signal source and said barometric rate signal source for providing said inertially-derived vertical velocity signal.

6. A method for correcting an airspeed signal for errors introduced by static pressure errors, comprising:
   comparing pitot pressure and static pressure to provide an indication of airspeed;
   comparing an inertially-derived vertical velocity signal with an airmass derived vertical velocity signal to provide an error signal in response to the difference therebetween; and
   utilizing said error signal to correct said airspeed indication.

7. A method for correcting an uncorrected airspeed signal for errors introduced by static pressure errors, comprising:
   utilizing the uncorrected airspeed signal to determine the differential pressure between pitot pressure and static pressure;
   comparing an inertially-derived vertical velocity signal with an airmass derived vertical velocity signal to provide an error signal in response to the difference therebetween;
   correcting the differential pressure between pitot pressure and static pressure utilizing the error signal to provide a corrected difference signal; and
   utilizing the corrected difference signal to provide a corrected airspeed signal.

8. A method for correcting an airspeed rate signal for errors introduced by static pressure errors, comprising:
   comparing an inertially-derived vertical velocity signal with an airmass derived vertical velocity signal to provide an error signal in response to the difference therebetween;
   providing an airspeed signal based on the difference between pitot pressure and static pressure; and
   utilizing the error signal and the airspeed signal to generate an airspeed rate error signal.

9. A method for compensating for dynamically induced errors in static pressure readings, comprising:
   providing an airmass derived vertical velocity signal;
   providing an inertially-derived vertical velocity signal;
   determining the difference between said airmass derived and inertially-derived vertical velocity signals to provide an error signal; and
   utilizing said error signal to compensate the static pressure reading.

10. An airspeed correction system for aircraft, comprising:
    means for providing an airmass derived signal representative of the vertical velocity of the aircraft;
    means for providing an inertially-derived signal representative of the vertical velocity of the aircraft;
    means for comparing the airmass derived and inertially-derived vertical velocity signals and providing a vertical velocity difference signal in response to the difference between the airmass and inertially-derived vertical velocity signals; and
    means responsive to said difference signal for providing an airspeed correction signal in response to the magnitude of the difference signal.

11. A static pressure correction system for aircraft, comprising:
    means for providing an airmass derived signal representative of the vertical velocity of the aircraft;
    means for providing an inertially-derived signal representative of the vertical velocity of the aircraft;
    means for comparing the airmass derived and inertially-derived vertical velocity signals and providing a vertical velocity difference signal in response to the difference between the airmass and inertially-derived vertical velocity signals; and
    means responsive to said difference signal for providing a static pressure correction signal in response to the magnitude of the difference signal.

12. The system recited in claim 11, further including a static pressure transducer and a ram air transducer and means responsive to said static pressure and ram pressure transducer for providing a signal representative of the difference between the static pressure and the ram pressure of the aircraft to provide a differential pressure signal, wherein said differential pressure signal providing means is responsive to said static pressure correction signal for providing a corrected differential pressure.

13. A rate of change of airspeed correction system for aircraft, comprising:
    means for providing an airmass derived signal representative of the altitude of the aircraft;
    means for providing an inertially-derived signal representative of the altitude of the aircraft;
    means for comparing the airmass derived and inertially-derived altitude signals and providing a difference signal in response to the difference between the airmass and inertially-derived altitude signals; and
    means responsive to said difference signal for providing an airspeed rate correction signal in response to the magnitude of the difference signal.

14. The system recited in claim 13, further including means for providing a signal representative of the airspeed of the aircraft, wherein said airspeed rate correction signal providing means is further responsive to said airspeed representative signal for providing said airspeed rate correction signal.

15. A method for correcting an airspeed signal for errors introduced by static pressure errors, comprising:
   comparing pitot pressure and static pressure to provide an indication of airspeed;
   comparing an inertially-derived altitude signal with an airmass derived altitude signal to provide an error signal in response to the difference therebetween; and
   utilizing said error signal to correct said airspeed indication.

16. A method for correcting an uncorrected airspeed signal for errors introduced by static pressure errors, comprising:
   utilizing the uncorrected airspeed signal to determine the differential pressure between the pitot pressure and the static pressure;
   comparing an inertially-derived altitude signal with an airmass derived altitude signal to provide an error signal in response to the difference therebetween;
   correcting the differential pressure between pitot pressure and the static pressure and utilizing the error signal to provide a corrected difference signal; and
   utilizing the corrected difference signal to provide a corrected airspeed signal.

17. A method for correcting an airspeed rate signal for errors introduced by static pressure errors, comprising:
   comparing an inertially-derived altitude signal with an airmass derived altitude signal to provide an error signal in response to the difference therebetween;
   providing an airspeed signal based on the difference between pitot pressure and static pressure; and
   utilizing the error signal and the airspeed signal to generate an airspeed rate error signal.

18. A method for compensating for dynamically induced errors in static pressure readings, comprising:
   providing an airmass derived altitude signal;
   providing an inertially-derived altitude signal;
   determining the difference between said airmass derived and inertially-derived altitude signals to provide an error signal; and
   utilizing said error signal to compensate the static pressure reading.

19. An airspeed correction system for aircraft, comprising:
   means for providing an airmass derived signal representative of the altitude of the aircraft;
   means for providing an inertially-derived signal representative of the altitude of the aircraft;
   means for comparing the airmass derived and inertially-derived altitude signals and providing a difference signal in response to the difference between the airmass and inertially-derived altitude signals; and
   means responsive to said difference signal for providing an airspeed correction signal in response to the magnitude of the difference signal.

20. A static pressure correction system for aircraft, comprising:
   means for providing an airmass derived signal representative of the altitude of the aircraft;
   means for providing an inertially-derived signal representative of the altitude of the aircraft;
   means for comparing the airmass derived and inertially-derived altitude signals and providing a difference signal in response to the difference between the airmass and inertially-derived altitude signals; and
   means responsive to said difference signal for providing a static pressure correction signal in response to the magnitude of the difference signal.

* * * * *